(12) United States Patent
Hayashi

(10) Patent No.: US 8,135,496 B2
(45) Date of Patent: Mar. 13, 2012

(54) TRAVEL CONTROL SYSTEM AND CONTROL METHOD FOR TRAVELING VEHICLES

(75) Inventor: Takao Hayashi, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 240 days.

(21) Appl. No.: 12/716,327

(22) Filed: Mar. 3, 2010

(65) Prior Publication Data

US 2010/0228389 A1    Sep. 9, 2010

(30) Foreign Application Priority Data

Mar. 5, 2009   (JP) .................................. 2009-051597

(51) Int. Cl.
*G06F 7/00* (2006.01)

(52) U.S. Cl. .............................. 700/229; 701/2; 701/408

(58) Field of Classification Search .................. 700/229; 701/207, 408; 712/225
See application file for complete search history.

(56) References Cited

U.S. PATENT DOCUMENTS

| | | | |
|---|---|---|---|
| 6,480,769 B1 * | 11/2002 | Kageyama | 701/23 |
| 8,036,771 B2 * | 10/2011 | Hayashi | 700/213 |
| 2008/0147306 A1 * | 6/2008 | Hayashi | 701/117 |

FOREIGN PATENT DOCUMENTS

| | | |
|---|---|---|
| JP | 62-027805 A | 2/1987 |
| JP | 03-276212 A | 12/1991 |
| JP | 06-289935 A | 10/1994 |
| JP | 11-134028 A | 5/1999 |
| JP | 2001-344018 A | 12/2001 |
| JP | 2008-150135 A | 7/2008 |

OTHER PUBLICATIONS

Official Communication issued in corresponding Japanese Patent Application No. 2009-051597, mailed on Feb. 10, 2011.

* cited by examiner

*Primary Examiner* — Thomas Black
*Assistant Examiner* — Shardul Patel
(74) *Attorney, Agent, or Firm* — Keating & Bennett, LLP

(57) ABSTRACT

A ground controller and traveling vehicles are connected to a communication system on the ground. Position instructions are given to the traveling vehicles in each position control cycle. The traveling vehicles generate a plurality of velocity instructions and torque instructions by themselves to carry out the position instructions.

11 Claims, 6 Drawing Sheets

△ 34:Access point

F I G. 5
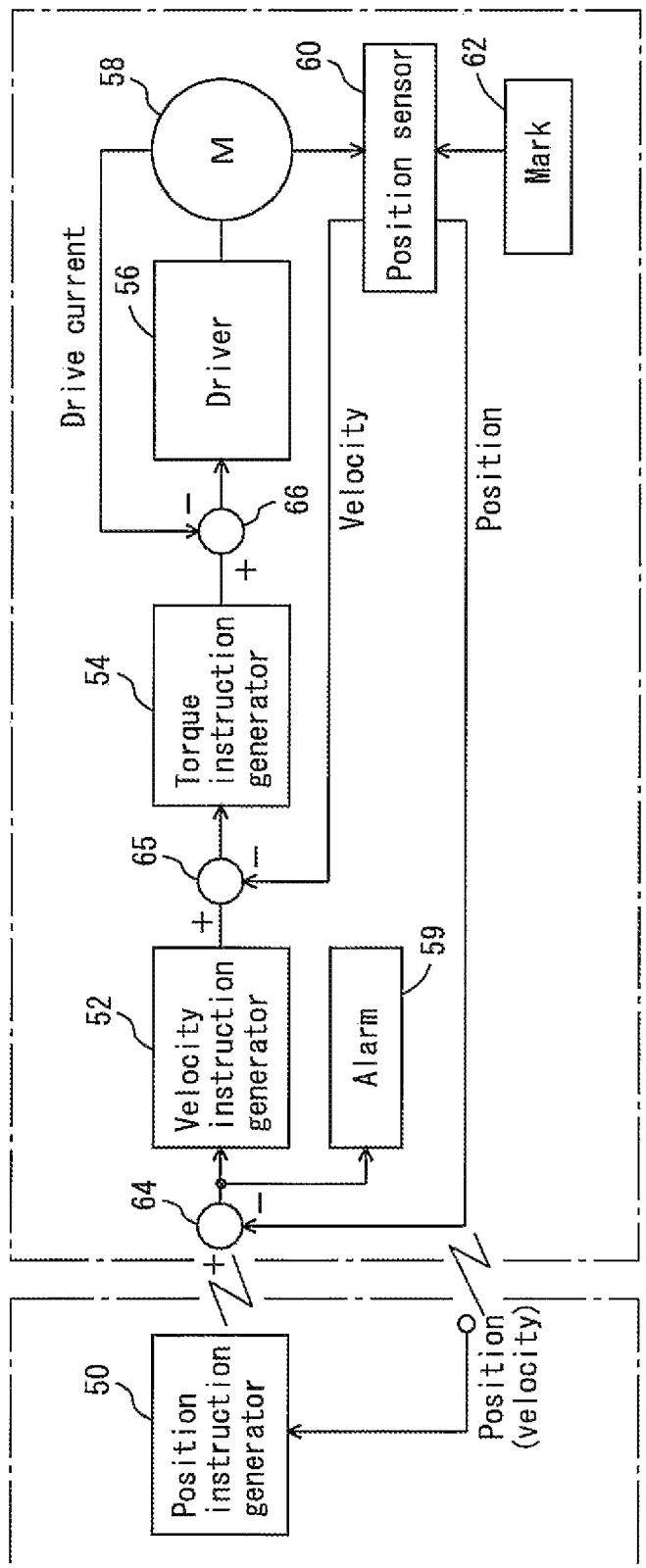

TRAVEL CONTROL SYSTEM AND CONTROL METHOD FOR TRAVELING VEHICLES

BACKGROUND OF THE INVENTION

1. Field of the Invention

The present invention relates to a travel control system and method for traveling vehicles. In particular, the present invention relates to centralized control system and method to travel control of the traveling vehicles by a ground controller.

2. Description of the Related Art

In a large scale traveling vehicle system such as an overhead traveling vehicle system, nearly several hundreds of traveling vehicles travel along a travel route, and travel instructions are given to the traveling vehicles from a ground controller for allowing the traveling vehicles to travel autonomously. Each of the traveling vehicles determines its travel route, and implements travel control by determining a distance to a leading traveling vehicle, e.g., using an inter-vehicle distance sensor or communication between the traveling vehicles. Further, the traveling vehicles pass through diverging points and merging points where reliability of the inter-vehicle distance sensor is low, one by one under exclusive control of the ground controller.

In the autonomous traveling system, because of the control delay between the traveling vehicles, it is difficult to allow the leading vehicle and the following vehicle to travel with a short interval therebetween. Specifically, the control delay is a period between the time when the inter-vehicle distance sensor of the following vehicle detects that deceleration of the leading vehicle has been started and the time when deceleration of the following vehicle is started. In the exclusive control, after a blocking request of the traveling vehicle is permitted by the ground controller, a report indicating that the traveling vehicle has passed the diverging point and the merging point is sent to the ground controller. During the time period until blocking is released, the diverging point and the merging point are occupied by one traveling vehicle. Further, in the case where the traveling vehicle determines the travel route autonomously, in the absence of sufficient information regarding the traveling routes of the other vehicles, a traffic jam may occur. In the large scale system, available information is the number of traveling vehicles in each segment, for example. Even if the current traffic jam information is obtained, traffic jam information in the future is not clear. Therefore, it is difficult to determine a particular travel route that can avoid traffic jams.

In view of these points, the inventor studied to implement centralized control for traveling vehicles by a ground controller. According to JP2008-150135A, travel control is implemented by a ground controller to avoid interference between traveling vehicles. However, the JP2008-150135A does not include any disclosure regarding in what manner instructions are provided from the ground controller in a large scale system, and in what manner the traveling vehicles execute the instructions.

SUMMARY OF THE INVENTION

Preferred embodiments of the present invention increase the throughput of a traveling vehicle system, and in particular, allow the leading traveling vehicle and the following traveling vehicle to travel with a short interval therebetween, and realize avoidance of traffic jams at diverging points and merging points. In this manner, in preferred embodiments of the present invention, wait time at process equipment or the like awaiting arrival of traveling vehicles such as transportation vehicles is minimized, and the utilization ratio of process equipment or the like is improved.

According to a preferred embodiment of the present invention, a travel control system for allowing a plurality of traveling vehicles to travel in accordance with instructions from a ground controller for transportation of articles includes a communication system arranged to provide for communication between the ground controller and the traveling vehicles, a position instruction generator provided in the ground controller, and a velocity instruction generator, a torque instruction generator, and a travel motor provided in each of the traveling vehicles.

Each of the traveling vehicles is configured to report at least a position of the traveling vehicle in each control cycle through the communication system.

The ground controller is configured to generate a position instruction for one control cycle for each traveling vehicle based on the report, and provide the position instruction for each traveling vehicle through the communication system.

The velocity instruction generator is configured to generate a plurality of velocity instructions in one control cycle based on a difference between a position of the position instruction and the position of the traveling vehicle.

The torque instruction generator is configured to generate a plurality of torque instructions for each of the velocity instructions based on a difference between a velocity of the velocity instruction and a velocity of the traveling vehicle to drive the travel motor in accordance with the torque instructions.

Further, another preferred embodiment of the present invention relates to a method of controlling a plurality of traveling vehicles to travel in accordance with instructions from a ground controller for transportation of articles. The method includes the steps of reporting at least a position of each traveling vehicle from the traveling vehicle to the ground controller in each control cycle through a communication system; generating a position instruction for one control cycle for each traveling vehicle by a position instruction generator of the ground controller to provide the position instruction for each traveling vehicle through the communication system; generating a plurality of velocity instructions in one control cycle by a velocity instruction generator of each traveling vehicle, based on a difference between a position of the position instruction and a position of the traveling vehicle; and generating a plurality of torque instructions for each of the velocity instructions by a torque instruction generator of each traveling vehicle, based on a difference between a velocity of the velocity instruction and a velocity of the traveling vehicle to drive a travel motor of the travel vehicle in accordance with the torque instructions.

In this specification, description regarding the travel control system is directly applicable to travel control method, and conversely, description regarding the travel control method is directly applicable to the travel control system.

In various preferred embodiments of the present invention, a position instruction is given to a traveling vehicle in each control cycle by a position instruction generator of a ground controller, and the traveling vehicle executes the position instruction. For example, the control cycle is preferably in a range of about 1 msec to about 100 msec. In one control cycle, a position report and a position instruction are present. Assuming that the number of traveling vehicles is in a range of 10 to 100, and the amount of data transferred per one transmission is 100 bytes, in total, the amount of data transferred in the communication is in the order of about 0.1 Mbs to about 100 Mbs (megabytes per second), for example. For this purpose, communication devices having capabilities of transferring the above amount of data are provided, e.g., along a ground LAN for wireless communication between the ground controller and the traveling vehicles to establish the communication system. In the case where each of the communication devices handles, e.g., 1 to 100 traveling vehicles, preferably, 1 to 10 traveling vehicles, suitable communication is achieved.

The position instruction generator keeps track of the position of the traveling vehicle based on the report from the traveling vehicle, and generates a position instruction for the traveling vehicle. In order to execute the position instruction, the traveling vehicle internally generates velocity instructions and torque instructions for driving the travel motor. Since the velocity instructions and the torque instructions are generated in the traveling vehicle, no communication is required. In comparison with the case of the position instructions, the velocity instructions and the torque instructions are generated with a short cycle. For example, the velocity instructions may be generated with a cycle in the order of msec, and the torque instructions may be generated with a cycle in the order shorter than the order of μsec to msec. Further, influence by the delay time from transmission of the position report by the traveling vehicle to reception of the report by the ground controller, and the delay time from transmission of the positional instruction by the ground controller to reception of the positional instruction by the traveling vehicle is minimized as much as possible, by synchronizing the clock time of the traveling vehicle and the clock time of the ground controller, and including the time of transmitting the report in the communication. In this regard, it is possible to generate velocity instructions synchronously with position instructions, and generate torque instructions synchronously with the velocity instructions.

In various preferred embodiments of the present invention, since a travel target position of each traveling vehicle is given from the ground controller, a plurality of traveling vehicles can travel synchronously with each other with a short inter-vehicle distance. Further, since no exclusive control is required at diverging points and merging points, the diverging points and the merging points do not become bottlenecks. Therefore, for example, it is possible to improve throughput of the traveling vehicle system, e.g., the total traveling distance and the average velocity significantly.

Preferably, the communication system includes a plurality of wireless LAN access points configured to wirelessly communicate with the traveling vehicles and arranged along a travel route of the traveling vehicles, and a ground LAN connecting the access points and the ground controller.

In the communication system, for example, feeder radio or superimposed communication to a non-contact feeder may be used. However, as is known in the art, communication through feeder radio is slow. In the superimposed communication to a non-contact feeder, for example, a frequency of about 100 KHz is used. At this frequency, since communication of 100 bytes can be performed only about 200 times per second, the communication capacity is not sufficient. In contrast, in the case of communication with the wireless LAN access points, communication of about 10 Mbs is possible per access point. One access point can communicate with 1 to about 100 traveling vehicles. As for the ground LAN, systems with the communication capability of about 10 Mbs to 1 Gbs have been put into practical use. Therefore, the ground controller can communicate with a large number of traveling vehicles.

More preferably, the position instruction generator of the ground controller controls an order of passage through the merging point on a travel route to control an order of traveling among the traveling vehicles. When a traveling vehicle is stopped at a load port or the like, the travel route is blocked by the traveling vehicle. Since the travel route of each traveling vehicle is known to the ground controller, for example, in the case where a plurality of traveling vehicles travel synchronously with each other, it is possible to determine which order among the traveling vehicles is preferred. For example, in a preferred order, the traveling vehicle that stops in the middle of the route is positioned at the end of the traveling vehicle group. In order to control the order among the traveling vehicles, at the merging point, which traveling vehicle goes first may be determined. Further, shortcuts, retreat lines, retreat and backward movement at the diverging points may be utilized for control of the order among traveling vehicles. In this manner, since the load ports or the like do not cause traffic jams, bottlenecks in the traveling vehicle system can be reduced.

Preferably, the ground controller further includes a memory arranged to store the position and the velocity of each traveling vehicle and a sorting unit arranged to sort a combination of traveling vehicles having possible interferences from the memory. For example, if the sorted combination is inputted to the position instruction generator, or the position and the velocity of the traveling vehicle in the sorted combination are inputted to the position instruction generator, the traveling vehicle as the target requiring avoidance of interference can be identified easily, and the position instruction for avoiding interference can be generated easily. The velocity of the traveling vehicle can be obtained by determining a difference from the reported position by the ground controller, or instructing the traveling vehicle to report the position and the velocity to the ground controller.

Particularly preferably, the position instruction generator generates position instructions for allowing the traveling vehicles in the combination to travel synchronously with each other. The synchronous traveling herein preferably indicates traveling of a plurality of vehicles at the same velocity, and with a predetermined inter-vehicle distance, e.g., an inter-vehicle distance as a function of velocity. Since the synchronous traveling is achieved by the position instruction generator providing position instructions to each traveling vehicle, a plurality of traveling vehicles can travel synchronously easily, and thus, the traveling vehicles can travel at high speed with a short inter-vehicle distance. Accordingly, further increase in the throughput is achieved.

Preferably, the position instruction generator generates a position instruction to instruct the traveling vehicle to move straight through a diverging point or diverge from the diverging point. In this manner, since control is implemented by the ground controller that knows the traveling directions of the respective traveling vehicles passing through the diverging point, the traveling vehicles can travel through the diverging point with a short inter-vehicle distance. In contrast, in the conventional blocking control, only one traveling vehicle is present at the diverging point, and a large inter-vehicle distance is required at the diverging point.

Preferably, the position instruction generator generates both of a position instruction to travel in a forward direction on the travel route, and a position instruction to move back on the travel route. In this manner, after the traveling vehicle is retreated, the traveling vehicle can move back to travel along the original travel route under control. In particular, the position instruction generator can retreat the traveling vehicle from an original route using at least one of a shortcut, the diverging point, the merging point, and a single track segment, and then, move the traveling vehicle back to the original travel route.

Preferably, the position instruction generator generates a plurality of position instructions for a plurality of successively moving traveling vehicles, to allow a traveling vehicle that stops for transfer of an article at the most upstream position to be retreated to travel at an end of a group of the traveling vehicles. In this manner, the order among the traveling vehicles can be switched. Therefore, in the case where a plurality of traveling vehicles travel synchronously with each other with a short inter-vehicle distance, when one traveling vehicle stops for transfer of articles, it is not necessary to stop the subsequent traveling vehicles.

Further, preferably, the travel control system further includes an error detector arranged to issue an alarm when a difference between the position of the position instruction and the position of the traveling vehicle exceeds a predetermined value. In this manner, when the traveling vehicle does not travel in accordance with the position instruction, suitable measures can be taken. For example, the traveling vehicle can carry out self-diagnosis of components such as a control system and a position sensor, the traveling vehicle can be retreated to a travel route where traffic is light, or the traveling vehicle can notify the problem to an operator.

Other features, elements, steps, characteristics and advantages of the present invention will become more apparent from the following detailed description of preferred embodiments of the present invention with reference to the attached drawings.

communication 1) shows reports from the traveling vehicle;

communication 2) shows position instructions from the ground controller to the traveling vehicle;

communication 3) shows velocity instructions generated in the traveling vehicle; and communication 4) shows torque instructions generated in the traveling vehicle.

Figure 4:
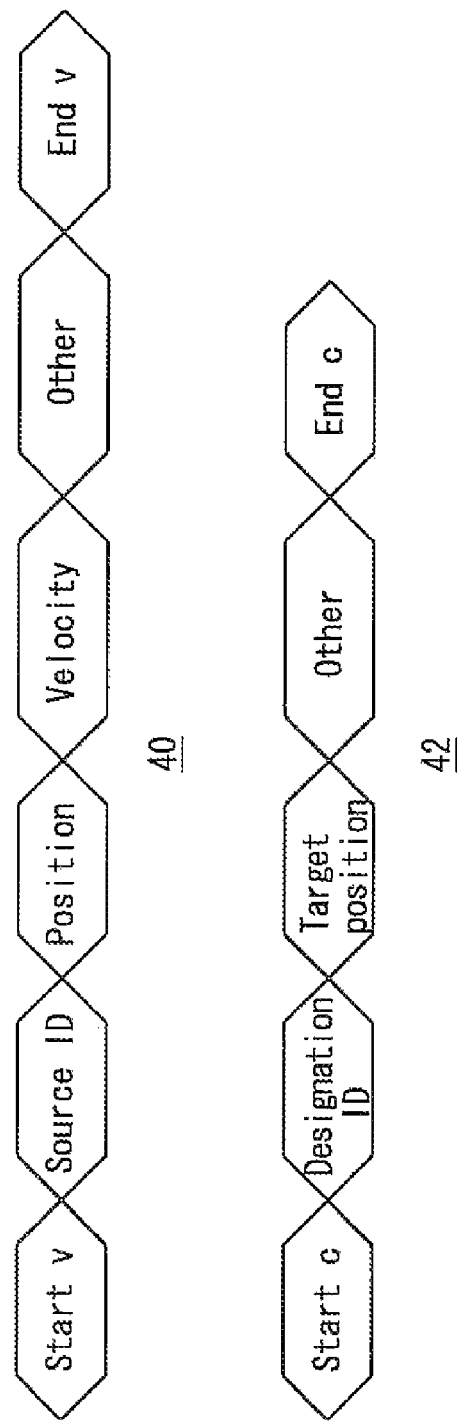

FIG. 4 is a diagram showing communication data transferred between the ground controller and the traveling vehicles.

FIG. 5 is a block diagram showing a travel control system in a preferred embodiment of the present invention.

Figure 6:
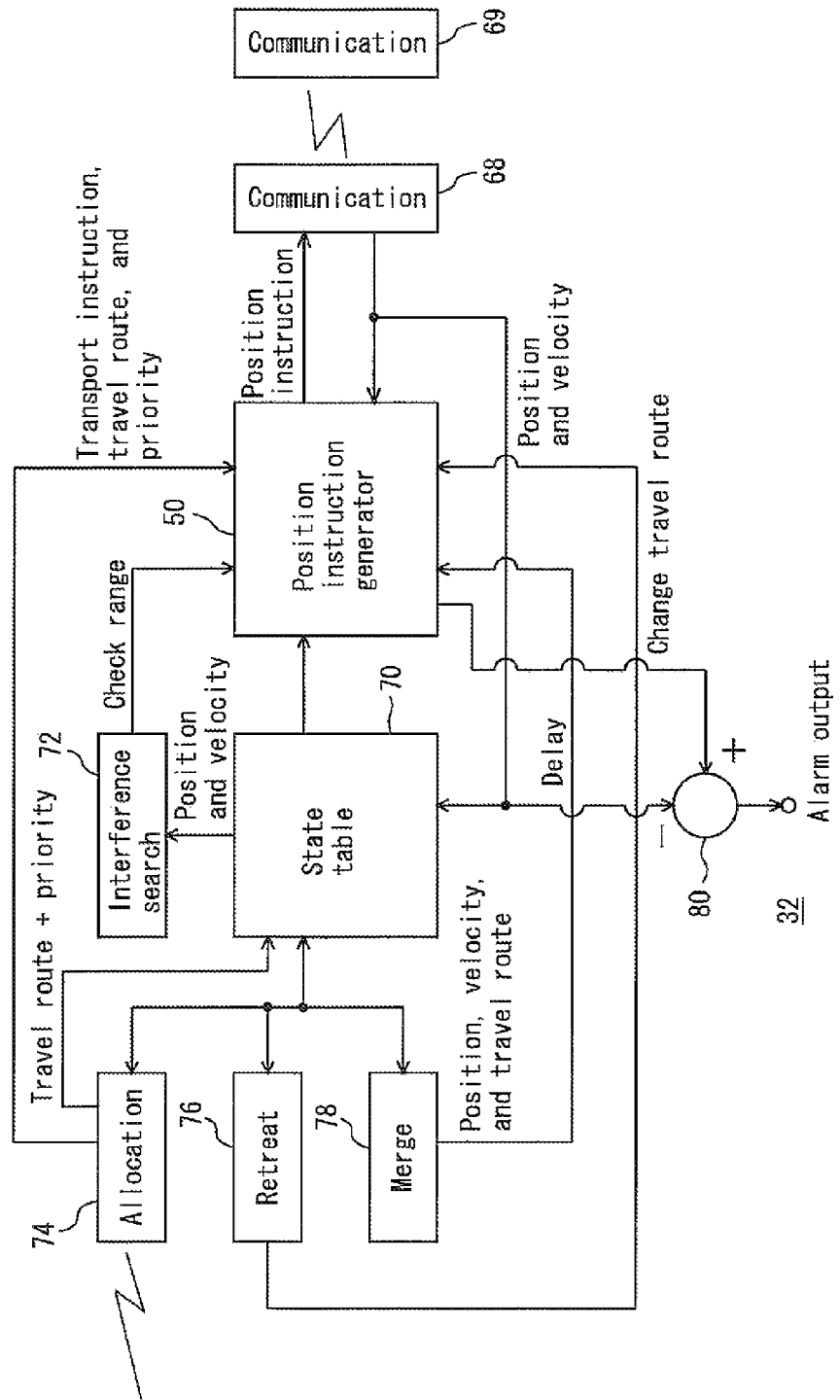

FIG. 6 is a block diagram showing components of the ground controller in a preferred embodiment of the present invention.

DETAILED DESCRIPTION OF PREFERRED EMBODIMENTS

Hereinafter, preferred embodiments of the present invention will be described. The preferred embodiments can be modified suitably with reference to techniques known in this technical field. Therefore, the preferred embodiments should not be construed as limiting the scope of the present invention.

Figure 1:
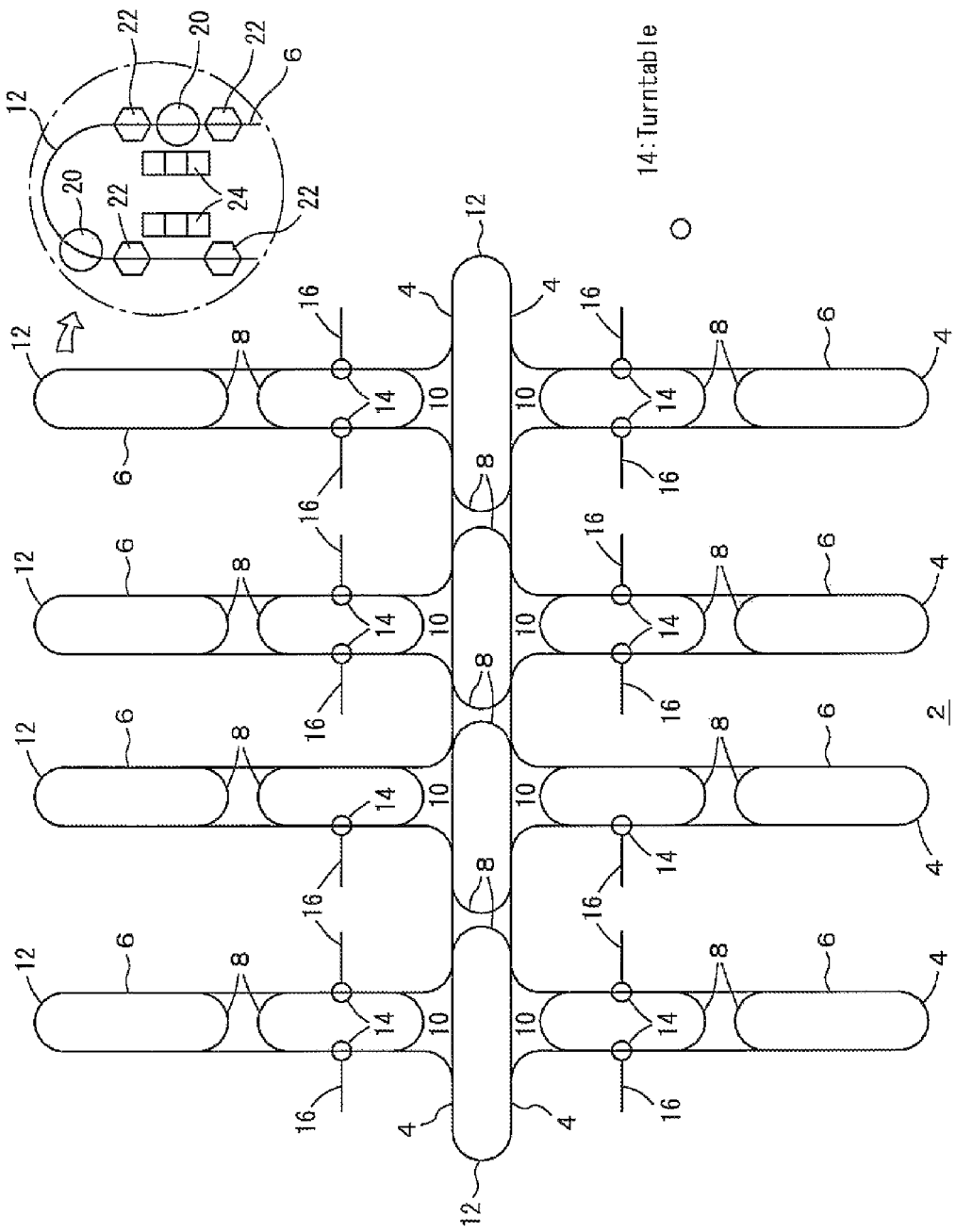
FIG. 1 is a plan view showing a layout of travel rails in a traveling vehicle system according to a preferred embodiment of the present invention.

FIGS. 1 to 6 show a travel control system and a travel control method according to a preferred embodiment. In the present preferred embodiment, although a system of overhead traveling vehicles is taken as an example, the present invention is applicable to a system of traveling vehicles that travel on the ground regardless of whether the traveling vehicles travel along rails or not. In FIG. 1, a reference numeral 2 denotes travel routes, such as travel rails provided in an overhead space in a clean room. The travel routes 2 include inter-bay routes 4 and intra-bay routes 6 diverging from the inter-bay routes 4. Further, the inter-bay routes 4, 6 and the intra-bay routes have shortcuts 8. The inter-bay routes 4 and the intra-bay route 6 are connected by joint sections 10, and each of the shortcuts 8 and the joint sections 10 include a diverging point and a merging point. Reference numerals 12 denote curves, and reference numeral 14 denotes turntables each connecting a single track segment 16 and the route 4 or the route 6. The traveling vehicle 20 changes its moving direction using the turntable 14, e.g., by 90°, and then, the traveling vehicle 20 is retreated into the single track segment 16 for transfer of articles at load ports and buffers provided along the single track segment 16. As shown in an upper right portion in FIG. 1, the traveling vehicle 20 travels along a travel route. Load ports 22 are provided below the routes 4, 6, and buffers 24 are provided on sides of the routes 4, 6, or below the routes 4, 6. For example, the number of the traveling vehicles 20 is about 100 to 1000. Although the traveling vehicle 20 has a transfer apparatus, articles may be transferred using a transfer apparatus provided on the ground.

In a normal traveling vehicle system, the traveling vehicle can only travel in one direction. However, in the present preferred embodiment, the traveling vehicle can move back. For example, after the traveling vehicle is retreated into the shortcut 8, the traveling vehicle can move back to the original travel route. Likewise, at the diverging point, after the traveling vehicle is retreated into a route diverging from the original travel route, the traveling vehicle can move back to the original travel route. Otherwise, after the traveling vehicle is retreated into the single track segment, the traveling vehicle can move back to the original travel route. Further, instead of using the diverging route for retreat, the traveling vehicle may move back at the merging point for retreat, and then, return to the original travel route. Further, the traveling vehicle can move back at the time of transferring articles between the buffers 24 and the load ports 22. The backward movement of the traveling vehicle is made possible because position instructions for the traveling vehicle 20 are generated by a ground controller 32 shown in FIGS. 2 and 6.

Figure 2:
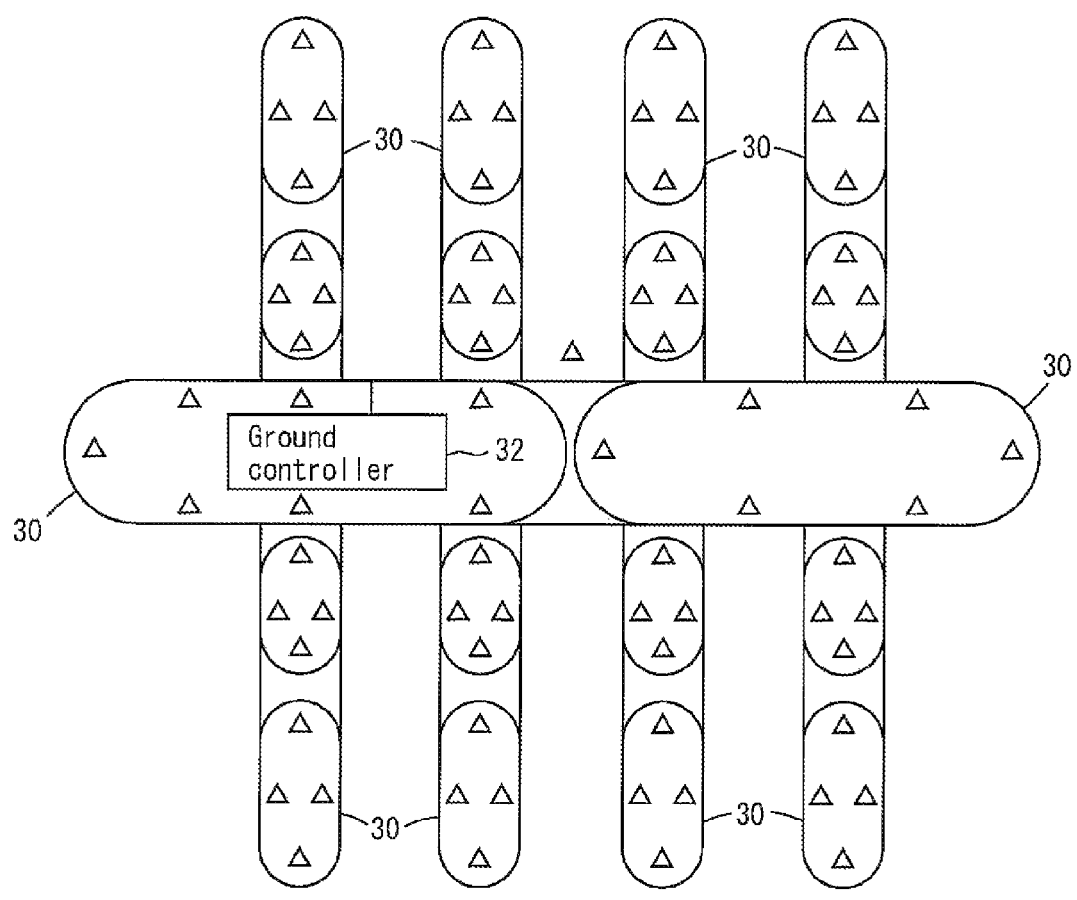
FIG. 2 is a plan view showing a layout of a LAN in the traveling vehicle system according to a preferred embodiment of the present invention.

FIG. 2 shows a layout of a LAN in the present preferred embodiment. Reference numerals 30 denote a ground LAN or a plurality of ground LANs. For example, the ground LAN 30 is provided along travel rails of the routes 4, 6. Alternatively, the ground LAN 30 is provided separately from the travel rails. For example, one ground controller 32, or two ground controllers 32 preferably are connected to the ground LAN 30. Wireless communication with a wireless communication controller (not shown) provided in the traveling vehicle 20 is performed through a plurality of access points 34. The ground LAN 30 has communication capability of, e.g., 100 Mbs to 1 Gbs. Communication capability between the access points 34 and the traveling vehicles 20 is, e.g., 0.1 Mbs to 100 Mbs, and preferably, 1 Mbs to 100 Mbs. The access points 34 are arranged to allow communication in the entire area of each route 4, 6, and for example, each of the access points 34 uses a different communication frequency to allow the traveling vehicle 20 to determine an access point used for communication, based on a layout map of the travel routes 4, 6 and the access points 34. Instead of using the map, suitable signals may be transmitted from each access point 34 at the frequency of the access point 34, and the traveling vehicle 20 may use a frequency of the reception signal with the highest signal strength for communication.

Figure 3:
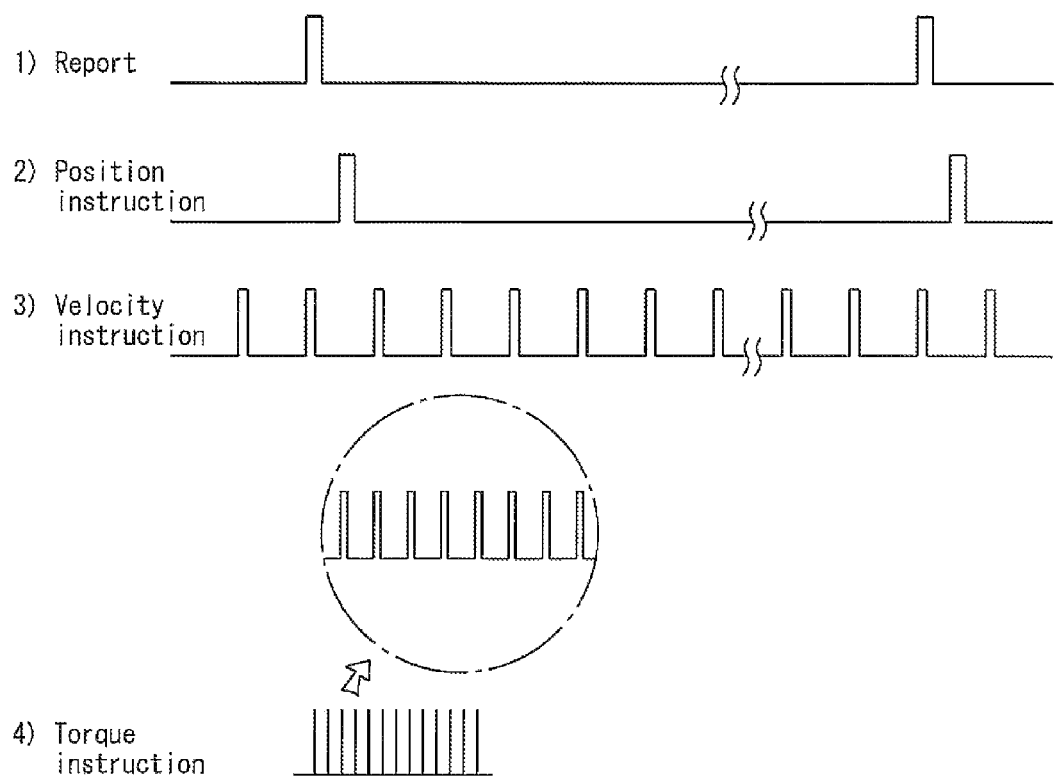
FIG. 3 is a diagram showing communication timings between a ground controller and traveling vehicles in the preferred embodiment to the ground controller, where.

FIG. 3 shows communication between the ground controller 32 and the traveling vehicle 20. For example, a communication cycle, i.e., a control cycle in a range of 1 msec to 10 msec, and more widely, 1 mesec to 100 msec is adopted. FIG. 3 shows communication between the ground controller 32 and one traveling vehicle 20. Initially, from each of the traveling vehicles, data such as the current position is reported to the ground controller. In response to the report, the ground controller generates a position instruction, and transmits the position instruction in each control cycle. The position instruction includes data of a target position of the traveling vehicle in the next control cycle. When the traveling vehicle receives the position instruction, within one control cycle (e.g., about 100 msec), a plurality of velocity instructions are separately generated at intervals of about 0.1 msec to about 1 msec, for example, and a plurality of torque instructions corresponding to the respective velocity instructions are generated to drive a travel motor. As the control cycle gets shorter, the cycle of generating the velocity instructions and the cycle of generating the torque instructions are shortened.

For example, 10 to 1000 velocity instructions are generated for each position instruction. Likewise, 10 to 1000 torque instructions are generated for each velocity instruction. In the communication system, bi-directional communication is adopted. Since the position instructions are transmitted only from the ground controller 32, no collision occurs between the position instructions. Since, e.g., only 1 to 10 traveling vehicles are present per one access point, basically, no collision occurs between reports from the traveling vehicles to the access point. Further, the access point has a switching function in the ground LAN 30. After the access point confirms the absence of collision, the access point sends a report to this effect. As a result, the current position can be reported, and the position instructions can be transmitted within the delay of about 10 μsec to about 100 μsec, for example, without causing any collision in the LAN.

FIG. 4 shows a communication format 40 from the traveling vehicle to the ground controller and a communication format 42 from the ground controller to the traveling vehicle. Each of the formats 40, 42 are started by a start signal of communication, and finished by an end signal of communication. Since the destination or the source of communication is the ground controller, an ID of the traveling vehicle is used as an ID of the transmission source in the format 40, and used as an ID of the transmission destination in the format 42. The communication format (report format) 40 includes data such as a position and a velocity of the traveling vehicle, a diverging direction, and execution of transfer. The communication format (position instruction format) 42 includes data such as a target position in one control cycle for each traveling vehicle. Both of the formats 40, 42 have data of, e.g., about 100 bytes. The amount of data transferred in communication per second is in the order of about 0.1M to about 100M bytes, since, for example, the number of traveling vehicles is 100 to 1000, and communication is performed about 10×2 to 100×2 times. In the case where a large amount of data is transferred in the communication, a plurality of the ground controllers 32 are provided, and each of the ground controllers 32 is allocated to handle portion of the travel route 2.

FIG. 5 shows a position instruction generator 50 of the ground controller 32, and a travel control system of the traveling vehicle 20. The position instruction generator 50 generates a position instruction to each traveling vehicle in each of control cycles, and inputs the position instruction to the traveling vehicle 20 utilizing the ground LAN and wireless communication. A reference numeral 52 denotes a velocity instruction generator, a reference numeral 54 denotes a torque instruction generator, a reference numeral 56 denotes a driver, and a reference numeral 58 denotes a servo motor for traveling. The position of the traveling vehicle 20 is determined by a position sensor 60 such as an encoder or a linear sensor. In the case where the linear sensor is adopted as the position sensor 60, a mark 62 such as a magnet provided adjacent to the travel routes 4, 6, is detected to determine the position. Based on the change in the data of the position sensor over time, the velocity is determined, and the velocity is inputted to a differentiator 65. Further, electrical current for driving the motor 58 is inputted to a differentiator 66, and a control signal is supplied to the driver 56 so as to compensate for the difference from electrical current according to the instruction from the torque instruction generator 54. The position determined by the position sensor is fed back to the differentiator 64, and a velocity instruction is generated by the velocity instruction generator 52 to eliminate the difference from the position according to the position instruction from the position instruction generator 50.

A position, preferably, a position and a velocity from the position sensor 60 are fed back to the position instruction generator 50 through a wireless LAN. Further, the difference between the feedback signal from the position sensor 60 and the position instruction is determined by the differentiator 64. In the case where the difference is a predetermined value or more, an alarm 59 carries out self-diagnosis of components such as the position sensor 60, the velocity instruction generator 52, the torque instruction generator 54, and the driver 56, and sends a report to the effect that the difference from the position instruction is the predetermined value or more and the self-diagnosis results to the ground controller 32. In the self-diagnosis, historical data of components such as the position sensor 60, the velocity instruction generator 52, the torque instruction generator 54, the driver 56 are checked, and abnormal states are detected, if any. In this manner, interference between the traveling vehicles can be prevented even more reliably.

FIG. 6 shows structure of the ground controller 32. A communication controller 68 of the ground controller 32 communicates with a communication controller 69 of the traveling vehicle through the wireless LAN. A reference numeral 70 denotes a state table for storing states such as an ID, a position, a velocity, a travel route, or the like for each of the traveling vehicles. As the travel route, a route passed by the traveling vehicle between the current location and the destination is described. The current position of the traveling vehicle is described using an address uniquely designating a position in the travel route 2.

An interference search controller 72 searches the state table 70 to determine combinations of traveling vehicles that may cause interference with each other. Data obtained in the search is inputted to the position instruction generator 50 as a range to be checked. Therefore, when the position instruction generator 50 generates a position instruction to one traveling vehicle, the position instruction generator 50 can figure out IDs of other traveling vehicles that need to be taken into consideration. For example, the position instruction generator 50 determines positions and velocities of the traveling vehicles from the state table 70 according to the IDs. If traveling vehicles that may interfere with each other travel synchronously with a constant inter-vehicle distance and a constant velocity over time, control becomes easy, and the throughput in the traveling vehicle system is increased. Possible combinations of traveling vehicles as targets of such synchronous control can be determined in the interference search controller 72.

An allocation controller 74 communicates with a host controller (not shown) or the like, and receives a transportation request. Further, the allocation controller 74 changes the transportation request into a transportation instruction, and allocates the transportation instruction to a traveling vehicle. The traveling vehicle has only to travel in accordance with the position instruction, and does not have to know the transportation instruction itself. The transportation instruction is inputted to the position instruction generator 50 and the state table 70. The transportation instruction includes data such as a destination, a travel route to the destination, a travel priority, a loading position, and an unloading position. The position instruction generator 50 generates a position instruction for executing the transportation instruction.

A retreat controller 76 controls retreat of the traveling vehicles. For retreat, as described above, the single track segment 16, the shortcut 8, and the joint sections 10 (diverging point and merging point) are used, and the leading traveling vehicle is retreated to a position deviated from the original travel route for allowing the following traveling vehicle to pass the retreated vehicle. The retreat controller 76 inputs the retreat destination to the state table 70 and the position instruction generator 50. The travel route is changed by retreat, and back-and-forth traveling to a retreat point is added in the middle of the route, as viewed from the state table 70 and the position instruction generator 50.

The merging controller 78 controls the order of traveling vehicles that travel in the merging point, and the position instruction generator 50 generates a position instruction in accordance with this order. For allowing the merging controller 78 to control the order of traveling vehicles that travel in the merging point included in the shortcut 8, the joint section 10 or the like, the merging controller 78 makes a request to the position instruction generator 50 to delay traveling of the traveling vehicle that should be delayed. For delaying the traveling vehicle, for example, the traveling vehicle may be controlled to wait in front of the merging point or the traveling vehicle may be decelerated on the upstream side of the merging point. In this manner, the merging controller 78 controls the successively moving traveling vehicles to travel in a preferred order.

The alarm 80 determines an error (difference) between the position of the traveling vehicle and the position indicated by a position instruction, and detects a traveling vehicle having a difference beyond a predetermined value. Otherwise, when the alarm 80 receives information to the effect that the difference has exceeded the predetermined value, from an alarm 59 of the traveling vehicle, the alarm 80 issues an alarm to an operator via a monitor (not shown) or the like. In the case where the traveling vehicle does not receive information to the effect that the difference has exceeded the predetermined value, from the traveling vehicle, a request is sent to that traveling vehicle to make self-diagnosis of components such as the position sensor 60, the velocity instruction generator 52, the torque instruction generator 54, and the driver 56. In the case where the difference is caused by data failures, or improper parameters in the control system, mostly, the difference can be eliminated by self-diagnosis. Except the case where restoration is made (difference is eliminated) successfully by self-diagnosis or the case where the trouble is only temporary, and eliminated automatically, since retreat is carried out after execution of the current transportation instruction is finished, the process until stopping of the traveling vehicle is automatically carried out depending on the degree of abnormality, or in accordance with inputs from the operator.

Operation of the present preferred embodiment will be shown. In the present preferred embodiment, since the traveling vehicle 20 travels in accordance with the position instruction from the ground controller 32, the ground controller 32 has all the information needed for avoiding interference between traveling vehicles. Therefore, for example, the successively moving traveling vehicles can be controlled to travel synchronously. Further, in general, the inter-vehicle distance between traveling vehicles is minimized, and also at the diverging point and the merging point, in comparison with the conventional exclusive control, the traveling vehicles can travel with a short inter-vehicle distance. Accordingly, the throughput in the traveling vehicle system is improved dramatically.

In the case where delay in the communication may raise a problem, for example, using the current time and the velocity in the report from the traveling vehicle, the position and the velocity at the time of reception of the report by the ground controller are estimated to generate a position instruction. On the traveling vehicle side, in the case where a clock having the time synchronized with the clock of the ground controller is used to recognize the start and end of each control cycle, and the position instruction is received later than the start of the control cycle, the velocity instruction is generated so as to carry out the position instruction in the remaining segments in that control cycle. During the delay period, for example, the last velocity instruction in the previous control cycle is still valid.

When the traveling vehicle 20 is stopped at a position facing the load port 22 or the buffer 24, the routes 4, 6 are blocked. In order to avoid the problem, among the successively moving traveling vehicles, the order of the traveling vehicles is switched using retreat into the merging point, the single track segment 16, the shortcut 8, and the diverging point, etc., so that the traveling vehicle that stops at the most upstream position such as the load port 22 or the buffer 24 can travel at the last position. Here, we assume the vehicles run from upstream positions to downstream positions. In the present preferred embodiment, the traveling vehicle can move back on the routes 4, 6, or the like. For example, the traveling vehicle temporarily moves into a diverging point such as the shortcut 8, and then, moves back to switch the order. Among the successively moving traveling vehicles, when the traveling vehicle that will stop first travels at the end of the traveling vehicle group, as long as the inter-vehicle distance with the next traveling vehicle group is longer than the travel distance corresponding to the period in which the traveling vehicle stops, the stop of the traveling vehicle does not decrease the throughput.

Since not only the current position and the velocity of the traveling vehicle but also the travel route to the destination are written in the state table 70, the travel route can be determined to avoid traffic jams further reliably. Further, since the travel route can be changed even after starting execution of the transportation instruction, based on the data of the state table 70, e.g., by the position instruction generator 50, traffic jams can be eliminated easily.

In the present preferred embodiment, bottlenecks of the traveling vehicle system are eliminated, and the total traffic and the average velocity of the traveling vehicles per unit time are improved significantly.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A travel control system for allowing a plurality of traveling vehicles to travel in accordance with instructions from a ground controller for transportation of articles, the travel control system comprising:
   a communication system arranged to enable communication between the ground controller and the traveling vehicles;
   a position instruction generator provided in the ground controller;
   a velocity instruction generator, a torque instruction generator, and a travel motor provided in each of the traveling vehicles;
   the traveling vehicles each being configured to report at least a position of the traveling vehicle in each control cycle through the communication system;
   the ground controller being configured to generate a position instruction for one control cycle for each traveling vehicle based on the report, and provide the position instruction for each traveling vehicle through the communication system;
   the velocity instruction generator being configured to generate a plurality of velocity instructions in one control cycle based on a difference between a position of the position instruction and the position of the traveling vehicle; and
   the torque instruction generator being configured to generate a plurality of torque instructions for each of the velocity instructions based on a difference between a velocity of the velocity instruction and a velocity of the traveling vehicle to drive the travel motor in accordance with the torque instructions.

2. The travel control system according to claim 1, wherein the communication system includes a plurality of access points configured to wirelessly communicate with the traveling vehicles and arranged along a travel route of the traveling vehicles, and a ground LAN arranged to connect the access points and the ground controller.

3. The travel control system according to claim 1, wherein the position instruction generator of the ground controller is arranged to control an order of passage through a merging point on the travel route to control an order of traveling among the traveling vehicles.

4. The travel control system according to claim 1, wherein the ground controller further includes a memory arranged to store the position and the velocity of each traveling vehicle and a sorting unit arranged to sort a combination of traveling vehicles having possible interferences from the memory.

5. The travel control system according to claim 4, wherein the position instruction generator is arranged to generate position instructions to allow the traveling vehicles in the combination to travel synchronously with each other.

6. The travel control system according to claim 5, wherein the position instruction generator is arranged to generate a position instruction to instruct the traveling vehicle to move straight through a diverging point or diverge from the diverging point.

7. The travel control system according to claim 6, wherein the position instruction generator is arranged to generate both of a position instruction to travel in a forward direction on the travel route, and a position instruction to move back on the travel route.

8. The travel control system according to claim 7, wherein the position instruction generator is arranged to generate a plurality of position instructions to retreat the traveling vehicle from an original travel route using at least one of a shortcut, the diverging point, the merging point, and a single track segment, and then, move the traveling vehicle back to the original travel route.

9. The travel control system according to claim 8, wherein the position instruction generator is arranged to generate a plurality of position instructions for a plurality of successively moving traveling vehicles, to allow a traveling vehicle stopping for transfer of an article at a most upstream position to be retreated to travel at an end of a group of the traveling vehicles.

10. The travel control system according to claim 1, further including an error detector arranged to issue an alarm when a difference between the position of the position instruction and the position of the traveling vehicle exceeds a predetermined value.

11. A method of controlling a plurality of traveling vehicles to travel in accordance with instructions from a ground controller for transportation of articles, the method comprising the steps of:
   reporting at least a position of each traveling vehicle from the traveling vehicle to the ground controller in each control cycle through a communication system;
   generating a position instruction for one control cycle for each traveling vehicle by a position instruction generator of the ground controller to provide the position instruction for each traveling vehicle through the communication system;
   generating a plurality of velocity instructions in one control cycle by a velocity instruction generator of each traveling vehicle, based on a difference between a position of the position instruction and a position of the traveling vehicle; and
   generating a plurality of torque instructions for each of the velocity instructions by a torque instruction generator of each traveling vehicle, based on a difference between a velocity of the velocity instruction and a velocity of the traveling vehicle to drive a travel motor of the travel vehicle in accordance with the torque instructions.

* * * * *